No Printed Specification Av
8667X
J. TINKLER.
Side-Hill Plow.
Patented Mar. 2, 1835.
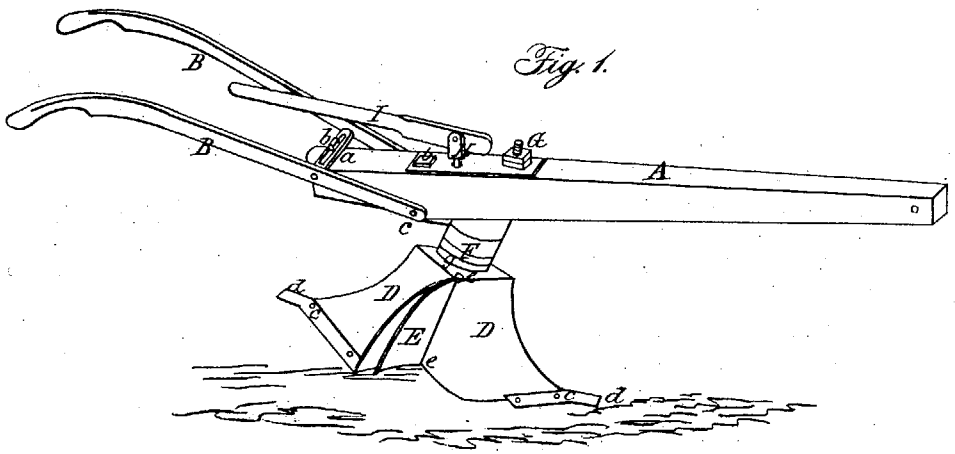
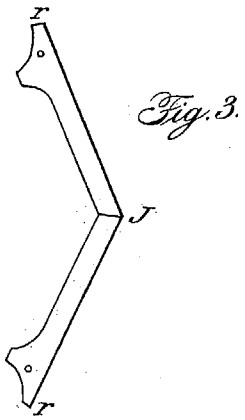
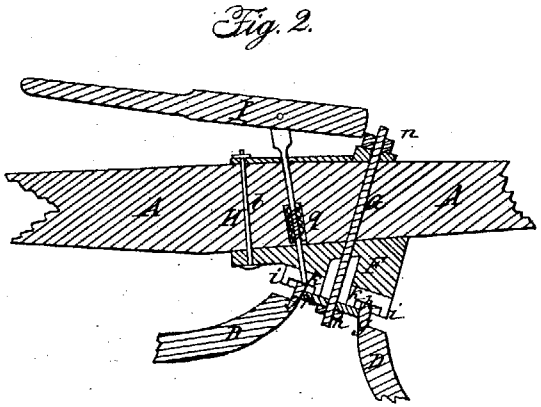
AM. PHOTO-LITHO. CO. N.Y. (OSBORNE'S PROCESS.)

3/2/1835 8661X
Mar. 2. 1835 5/7

Joseph Tinkler
Letters Patent
(Patented March 2. 1835.)

The Schedule referred to in these Letters Patent and making part of the same containing a description in the words of the said Joseph Tinkler himself of his improvement in the construction of Ploughs

---

To all to whom these presents shall come. Be it known that I the said Joseph Tinkler have invented constructed and applied to use new and useful improvements in the art of constructing Ploughs. The Plough containing said improvements is specified in the following words viz Take any two common ploughs made in such form and of such materials as will best suit the wishes of the Farmer in the section of country where it may be introduced, which must be constructed as nearly alike as the skill of the mechanic will admit, but with this exception that the one must turn the furrow to the right hand and the other to the left. (D.D.) then fasten the two together in one piece with the shares (C.C) or points turned opposite to each other in such a manner that the land side r. J. r. of the two will exactly range which are also joined in one piece on an angle of one hundred and twenty eight degrees So that when one point is in the ground the other will be elevated fifty two degrees. Before uniting the two mould boards together it will be necessary to cut a considerable portion (E) of the back end of each off for the purpose of rendering the plough as light and convenient as possible but in no case must the upper ends of the two (g.g.) (on the land side) come nearer than six or seven inches of each other. The space between will form an angle where the two meet. Within this angular space must be placed a hollow cylinder (g.g.) five inches in diameter inside and of a convenient depth for the height of the plough. On the upper end of this cylinder is placed a cylindric ring (h, h) four inches in diameter inside and seven outside leaving the size of it one and a half inches the thickness must be half an inch. The upper side of this ring must be so placed that when a line is extended from it both ways over each point (d, d,) and level with it that the perpendicular distance from each point to the line will be the same. This ring will then project over the the inside of the cylinder on which it is placed half an inch all round.
The mould board (D.D) the cylinder (g.g.) and the ring (h.h.) must be made in
one piece with the cylinder and ring projecting one half over the land side
for the purpose of placing the centre of the beam over the land side of the
plough. So much of each plough (E) as was cut off before uniting them
together may be alternately attached to the plough by bolts or otherwise
according as it is required to make either the right or the left handed
point a full plough, or take two pieces of sheet iron and shape them
like the two pieces (E.) cut off and put them together with the back of each
to each and rivet them fast observing where they do not touch each other
to put a piece of good solid timber between and rivet through it. That
part of this double wing which is joined to the plough will have a con-
siderable opening to fill with timber into which put two screw bolts the
one near the bottom and the other towards the top. The bolts must each have
a hole in the end standing out from the wing 3/8 of an inch in diame-
ter. Corresponding with these bolts must be two holes in the mould board
through which they must pass and be fastened by a rod (e.e.) passing up
on the inside of the plough exactly where the two meet together. This bolt
must be kept to its place by holes through two lugs projecting from
the back side of the mould board. The holes through the mould board
must be sufficiently long to let the wing turn backwards and for-
wards to answer each points. Where the ground is much inclined the
detached wing will not be necessary. Construct a hollow cylinder (F)
four inches in diameter outside 3/8 of an inch thick, 3 3/4 inches deep be-
fore and 1 1/2 behind with a flange or ring (i.K.) wide enough to extend over
the cylindric ring (h.h. on the top of the plough and turn down over the
out edge of it sufficiently far to prevent any dirt from getting in, cast
about it half an inch from the lower end. On the top of the cylinder is put
a flat plate 8 inches long and four wide commencing at the highest side
and projecting back over the flange. This plate is made in one piece
with the cylinder on which it is placed and has a hole one inch in di-
ameter directly over the centre of the cylinder. Construct a round plate
(P) five inches in diameter and half an inch thick with a hole through
the the centre one inch in diameter. This plate is put up on the inside of the neck (g.g.) of the plough (a cylinder made fast to it) as far as the ring (h, h) projecting over will permit. It there meets the lower end of the last described cylinder (F) and is fastened to it by a bolt (G) passing through both. There must be a lug raised on each side of the round plate (P.) exactly where the end of the cylinder (E) meets it with corresponding nitch is in the lower end of the cylinder to prevent the one from turning without the other. The bolt passing down through the cylinder (F.) passes up through the beam (A.) and fastens it by a nut (n,) above to the plate on the top of the revolving cylinder (F). Another bolt (l) 3/8 of an inch thick passes up through the hind end of the same plate and beam to prevent it from turning without the cylinder. A pin (H.) ½ an inch in diameter passes down through the beam a little forward of the last mentioned bolt (l.) and through the flange (i, k,) in the cylinder into the neck of the plough to prevent it from turning while in the act of ploughing. This pin is raised or drawn up by a lever (I,) attached to the upper end of it. In order to ensure the entering of the pin (H) in turning without the help of the plough man a spiral or other spring (q) is attached to it. The handles (B.B.) are fastened to the beam by two flat rods of iron one (c) 5 inches between the tenons with a hole through centre passing transversely through the lower part of the beam. The small bolt (l) which passes up through the plate and beam, passes through it and keeps it to its place. The other (a,) is 12½ inches between the tenons and has a slit in the centre 7 inches in length and is fastened to the upper side of the beam near the hind end (or sufficiently far back to give the handles a proper elevation) by a screw bolt (b) passing down through the slit. This rod (a,) is curved to correspond with the arc of a circle described by a radius equal to the distance between the two rods (a & c). The handle (B.B.) are fastened to the tenons and may be moved to either side by the bolt (b) and slit to suit the ploughman. The above described plough is designed for both a hill side and flat land plough. It may be used as a common or double plough. The method of turning or changing it from point to point is simply at the end instead of going for Rules to my knowledge consists as follows. The common joint is composed of
more or less pieces of metal which when placed together form a solid mass of the thickness
of the Rule and is attached to the Box wood or other material composing the Legs
of the Rule by removing a portion of their thickness to receive the joint which
diminishes their strength. This joint possesses little or no elasticity consequently
as it wears it becomes loose. My improved joint is applied to the Rule without
removing any of its thickness to receive it which is one of the principles I
claim as my invention.

The manner of forming the joints of thin plates attached
to the sides of the two legs, the intervening space being filled with the substance
of the Rule itself instead of the more expensive mode of filling that space with
metal is another principle I claim as my invention My joint thus formed
and applied possesses a degree of elasticity operating as a perpetual spring which
prevents the joint from ever wearing loose.

Exd. Witnesses
W.G. J. C. M. Clark
John Holland

Samuel Hedge

Drawing [illegible] 6.15 [illegible]